Feb. 28, 1933.  C. V. JONES  1,899,806
COTTON CHOPPER AND CULTIVATOR
Filed June 4, 1932    4 Sheets-Sheet 4
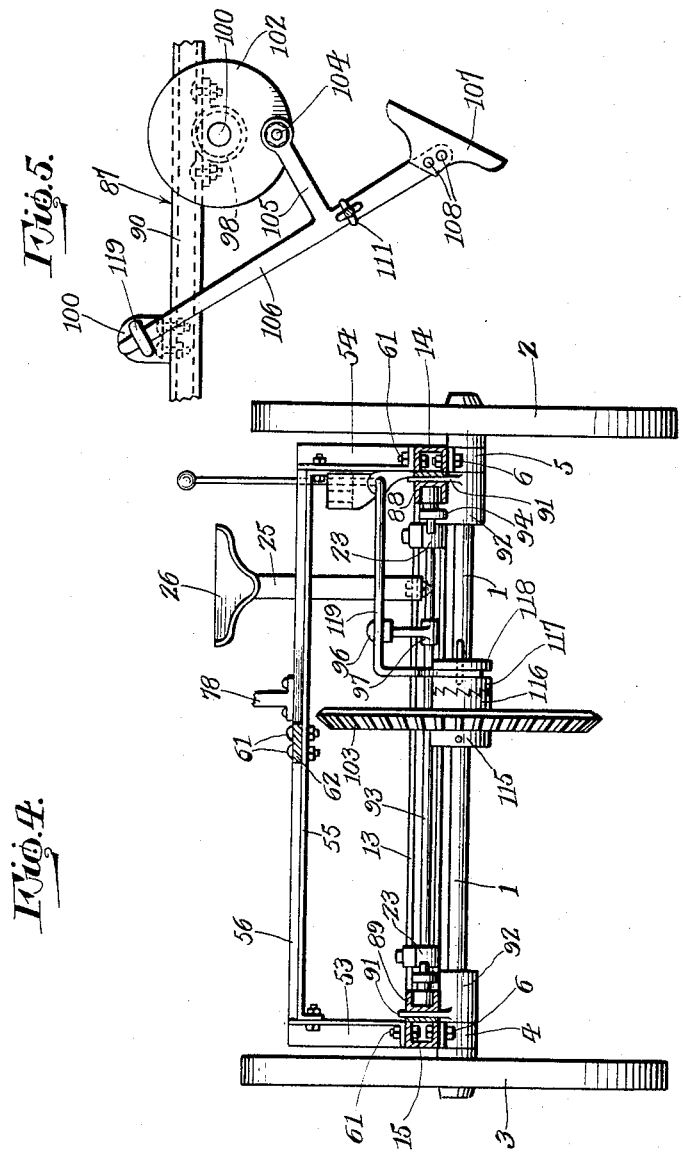
Inventor
C. V. Jones
By Geo. P. Kimmel
Attorney Patented Feb. 28, 1933

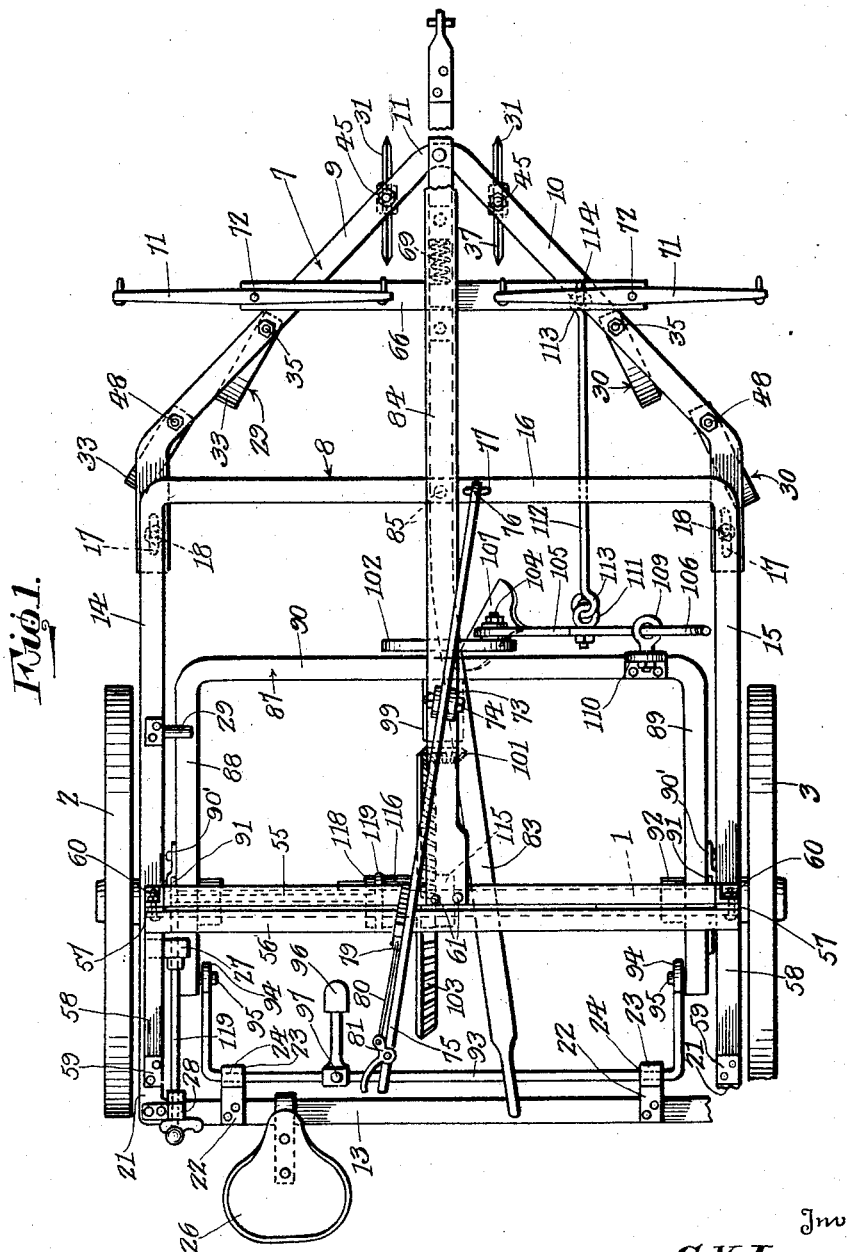

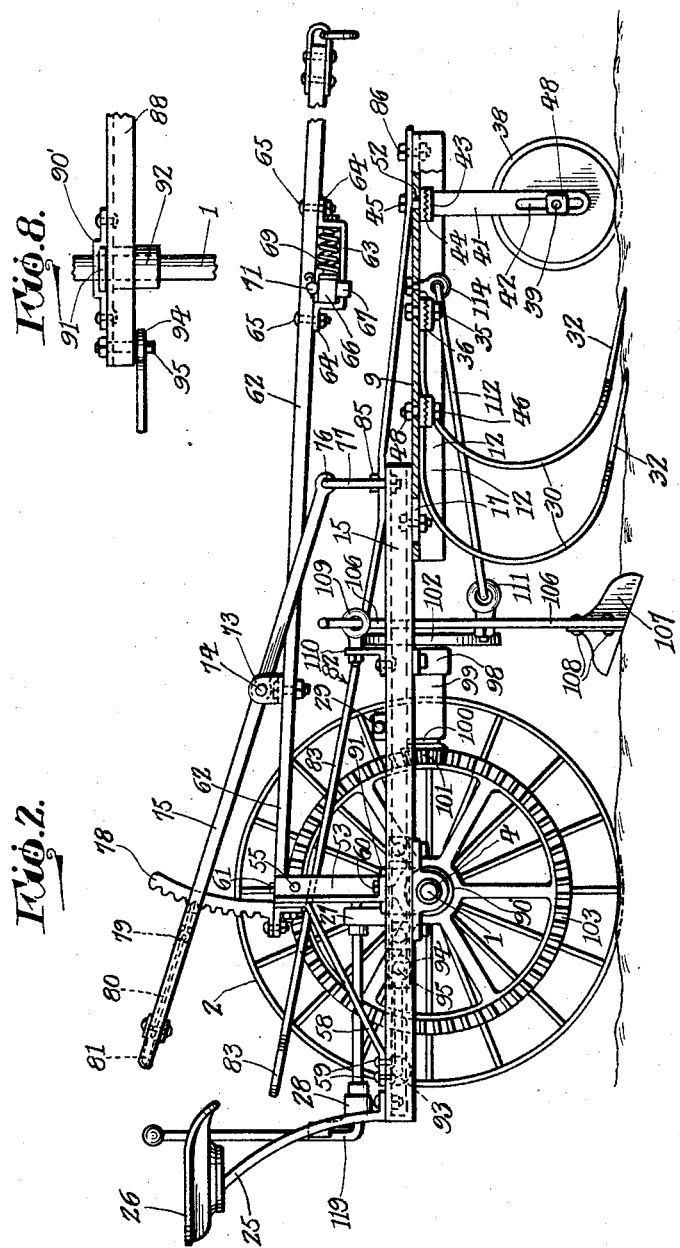

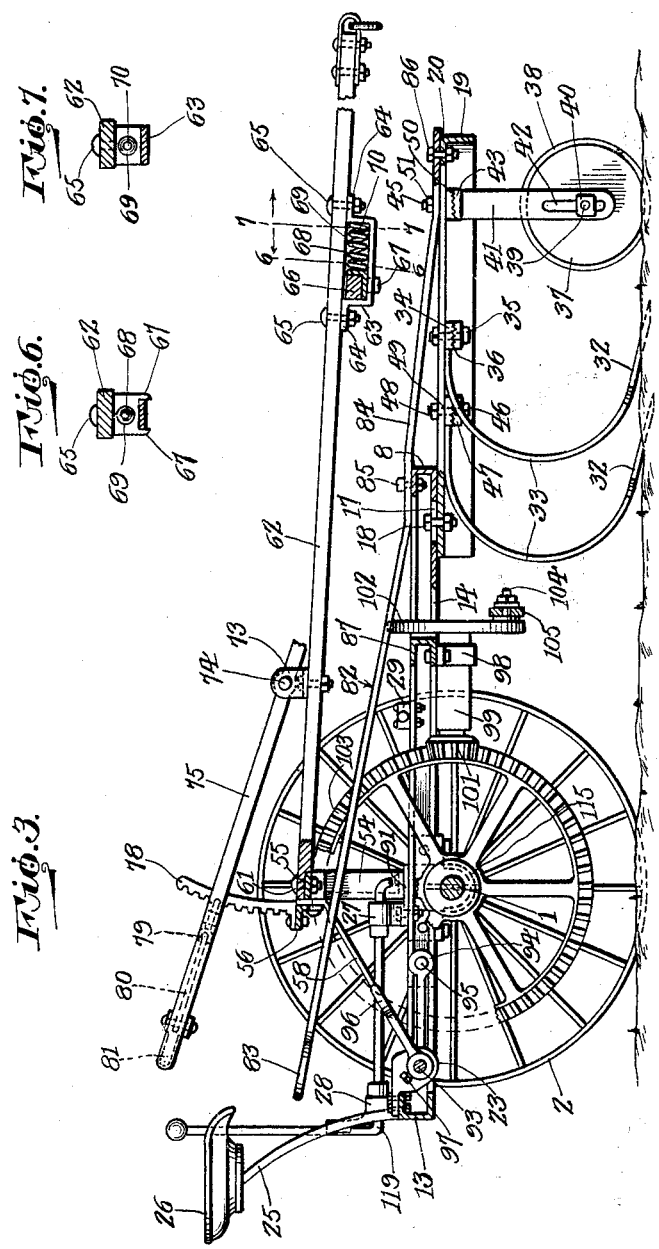

1,899,806

UNITED STATES PATENT OFFICE

CLAUDIUS V. JONES, OF JACKSON, MISSISSIPPI, ASSIGNOR OF ONE-HALF TO HOWARD C. FERGUSON, OF JACKSON, MISSISSIPPI

COTTON CHOPPER AND CULTIVATOR

Application filed June 4, 1932. Serial No. 615,449.

This invention relates to a cotton chopper and cultivator, and has for its object to provide a machine of such class, in a manner as hereinafter set forth for expeditiously and efficiently chopping, or thinning and cultivating cotton.

Further objects of the invention are to provide, in a manner as hereinafter set forth, a machine of the class referred to which is comparatively simple in its construction and arrangement, strong, durable, compact, thoroughly efficient in its use, readily assembled, conveniently adjusted when desired and comparatively inexpensive to set up.

With the foregoing and other objects in view, the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a fragmentary view in plan of a cotton chopper and cultivator in accordance with this invention.

Figure 2 is a side elevation thereof partly in section.

Figure 3 is a longitudinal sectional view thereof.

Figure 4 is a rear elevation partly in section.

Figure 5 is a fragmentary view, in front elevation illustrating the chopper element and its actuating means.

Figure 6 is a section on line 6—6, Figure 3.

Figure 7 is a section on line 7—7, Figure 3.

Figure 8 is a fragmentary view in plan illustrating a connecting means between the chopper element carrying frame and the axle of the machine.

A combined cotton chopper and cultivating machine, in accordance with this invention comprises a supporting frame which is mounted upon an axle 1 provided with a pair of wheels 2, 3. The axle 1 carries a pair of connecting members 4, 5 which are secured to the supporting frame by the holdfast devices 6. The connecting members couple the supporting frame with the axle 1 in a manner to permit a swinging movement of the supporting frame relative to the axle 1 when the frame is elevated, in a manner as hereinafter referred to from the front end thereof and which also applies when lowering the front end of the frame.

The supporting frame comprises a pointed or V-shaped forward section and a rectangular rear section referred to generally by the reference characters 7, 8 respectively.

The section 7 is constructed from an angle bar of appropriate length bent to provide a pair of oppositely extending inclined portions 9, 10 coupled together at their forward ends by a rounded portion 11. The portion 9, as well as the portion 10 terminates in a rearwardly extending right angularly disposed portion 12. The portions 12 are arranged in parallelism. The portions 9 and 10 extend forwardly and at an inward inclination with respect to the portions 12.

The section 8 comprises a pair of channel irons constructed in a manner to provide a rectangular frame. One of the channel irons is the rear bar of the frame and indicated at 13. The other channel iron is bent to provide the side members 14, 15 and the front member 16 of the frame. The side members 14, 15 and front member 16 of the section 8 are positioned upon the portions 12 of the section 7. The bottoms of the side members 14, 15 at the forward terminal portions thereof, are provided with lengthwise disposed slots, best shown in Figures 1 and 3, and extending through the slots 17 and engaging with the portions 12 of the frame 7 are holding devices 18 for adjustably connecting the section 7 to the section 8. The angle bar from which the section 7 is constructed is so disposed, in vertical section to provide a vertical leg 19 and a horizontally disposed leg 20, the latter extending inwardly from the top of the former, see Figure 3. The holding devices 18 are connected to the horizontal leg 20 of the section 7.

The rear bar or member 13 of the section 8 is connected to the side members 14 and 15 of said section 8 by corner pieces 21 and secured to said rear member 13 is a pair of spaced forwardly extending arms 22 having enlarged forward ends 23 provided with openings 24. Secured to the rear member 13 of the section 8 is a seat post 25 having attached to its upper end a seat 26. The post 25 extends rearwardly at an inclination with respect to the rear bar 13 of the section 8.

Depending from the front section 7 of the supporting frame are two sets of cultivator teeth or shovels and a set of cultivating discs. As illustrated the number of teeth or shovels of each set is two, but this number can be increased if desired. The number of cultivator discs of a set is two. The cultivator teeth or shovels of one set are indicated at 29 and those of the other set at 30. The cultivating discs of a set are indicated at 31. The cultivator teeth or shovels, as well as the discs, are angularly adjustable with respect to the section 7. As the cultivator teeth or shovels are of the same construction, but one will be described as the description of one will apply to the other. Each cultivator disc or shovel consists of a tooth or shovel portion 32 having formed integral therewith a curved resilient shank 33, which at its upper end merges into a circular head 34 provided with an axial opening 35 and having its lower face toothed as at 36. Each disc of a set of discs consists of a circular body portion 37 provided with a cutting edge 38. The body portion 37 is provided with a shaft 39 which is mounted in an adjustable bearing 40 carried by a hanger 41. The hanger 41 is formed in its lower portion with a lengthwise extending slot 42 through which extends the shaft 39. The upper end of the hanger 41 is provided with a circular head 43 having its upper face toothed as at 44. Formed integral with the head 43 and extending upwardly therefrom is a threaded bolt 45.

The set of teeth or shovels 29 are carried by the portion 9 of the section 7 of the supporting frame and the set of teeth or shovels 30 are carried by the portion 10 of said section 7. The discs 31 are carried by the portions 9 and 10 of the section 7. Each tooth or shovel is secured to the section 7 by a headed bolt 46, a washer 47 having its upper face toothed and a nut 48 carried by the bolt 46. The portions 9 and 10 of the section 7 are provided with openings 49 for the passage of the bolt 46. The washers 47 are arranged below the heads 45 and the teeth of the washers engage in the teeth of the heads. The washers 47 are mounted on the bolts 46 between the heads of these latter and the heads 34. The nuts 48 are positioned against the upper face of the horizontal leg 20 of the angle bar forming the forward section 7 of the supporting frame. The teeth or shovels can be adjusted to any desired angle with respect to the section 7, and after adjustment, the toothed engagement of the washers 47 with the heads 34 of the teeth or shovels, after the nuts 48 are screwed home, will maintain the teeth or shovels in the position to which they have been angularly adjusted.

Each of the hangers 41 can be adjusted on a vertical axis to provide for the angular disposition of a disc 31 with respect to the forward section of the supporting frame and after being adjusted can be locked in such position. In this connection it will be noted that each hanger 41 is connected with the forward section 7 by a holdfast means consisting of a washer 50 and a nut 51 coacting with a bolt 45. The washer 50 coacts with the toothed head 43 of the hanger 41. The lower face of the washer 50 is toothed. The washer is mounted on the bolt 45 between the horizontal leg of the angle iron which forms the section 7 and the head 43. The toothed lower face of the washer engages the toothed upper face of the head 43. The nut 51 engages the upper face of the horizontal leg referred to. After the hanger 41 has been adjusted so as to position the disc 31 at the desired angle with respect to the section 7, the nut 51 is screwed home and the engagement of the teeth of the washer 50 with the teeth of the head 43 will maintain the disc 31 in set position. The section 7 is provided with openings 52, see Figure 2, for the passage of the bolts 45 which extend upwardly from the heads of the hangers 41. One of said openings is arranged at the forward part of the portion 9 and the other of said openings at the forward part of the portion 10 of the section 7 of the supporting frame.

The holdfast devices which secure the connecting members 5 to the supporting frame extend through the bottoms of the side members 14 and 15 of the section 8, see Figure 4. Secured to the tops of the side members 14 and 15 of the section 8 directly over the axle 1 is a pair of uprights 53, 54. Arranged between the upper end of the uprights 53, 54 as well as being secured therewith is a transversely extending support 55. Arranged rearwardly of, but in parallelism with the support 55, is a transversely extending support 56. Extending between the uprights and supports 56, at the opposed ends thereof is the vertically extending upper terminal portion 57, of a downwardly inclined brace member 58, having its lower end secured to a side member 14 or 15, as at 59. The upper end terminal portions 57 of the brace members 58 are fixedly secured to the ends of the support 56 and uprights 53 and 54 by the holdfast devices 60.

Secured at its rear, by the holdfast devices 61, to the support 55 centrally thereof, is a forwardly extending draft beam 62. Carried by and arranged below the beam 62 is a spring controlled double tree assembly comprising a keeper 63 of yoke shaped contour and formed at its top with oppositely extending flanges 64. Each flange 64 is secured to the beam 62 by a holdfast device 65. Extending through the keeper 63 at the rear thereof, is a double tree 66 provided with a pair of depending spaced lugs 67 which overlap the side edges of the bottom of the keeper 63. The double tree 66 centrally of its forward side, is provided with a lug 68 which extends into one end of a coiled controlling spring 69 for the double tree 66. The forward end of the keeper 63 is formed with a rearwardly extending lug 70 which extends into the other end of the spring 69 that is to say the forward end of said spring. The normal position of the double tree 66 is shown in Figure 3 and is shiftable in a direction lengthwise with respect to the keeper 63. A single tree 71 is pivotally mounted on the double tree at each end thereof as at 72. The beam 62 and double tree 66 are maintained a substantial distance above the forward section 7 of the supporting frame. Secured to the top of the beam 62, at a point between the double tree 66 and the rear end of the beam 62, is a vertically disposed yoke-shaped member 73 which extends diagonally with respect to the top of the beam 62. Pivotally mounted in the member 73 as at 74, is a combined lifting and sustaining lever 75 which extends across the beam 62 at an inclination, and has its forward end provided with an eye 76 for connection to a vertically disposed eye bolt 77 carried by or secured to the forward frame member 16 of the section 8, see Figures 1 and 2. Secured to the support 56, adjacent one side of the rear end of the beam 62 is a vertically disposed arcuate rack bar 78 which associates with a pawl 79 carried by a shifting rod 80 therefor. The rod 80 is pivotally connected to a lever member 81 attached to the rear end of the lever 75. When the pawl or dog 79 is in engagement with the rack 70 the lever 75 is maintained in the position to which it has been shifted. The lever 75 is provided for lifting and lowering the front of the supporting frame. When the lever is shifted to lift the front of the supporting frame, the section 8 is elevated, which carries the section 7 therewith and when the section 8 is lowered the section 7 is also carried therewith.

The lever arm 82 includes an inclined rear portion 83 which is disposed in an opposite direction with respect to the lever 75. The lever arm 82 further includes a forward portion 84 arranged under the beam 62 and is connected to the front frame member 16 of the section 8, by the coupling device 85 and is also secured by the holdfast device 86 to the forward end of the section 7. The portion 83 of the lever 82 extends upwardly at an inclination so as to be in convenient reach of the driver and the portion 84 of the lever 82 extends at a downward inclination from the section 8 of the supporting frame towards the section 7 thereof. See Figure 3.

Arranged within the section 8 of the supporting frame is a pivoted supporting element 87 for the chopper or hoe member and the actuating means for the latter. The supporting element 87 is formed from a channel iron of appropriate length and bent to provide a pair of side portions 88, 89 and a front portion 90. Each side portion of the element 87 in proximity to the rear thereof has secured to its outer face a coupling member 90' and which coacts with a vertically disposed rectangular arm 91 formed integral with the top of a sleeve 92 mounted on the axle 1 inwardly with respect to a connecting member 4 or 5. See Figure 4. The coupling members 90' in connection with the arms 91 and sleeves 92 provide for the shiftable mounting of the supporting element 87 upon the axle 1. The supporting element 87 can be adjusted to regulate the depth of cut of the chopper or hoe member to be presently referred to, and for such purpose a yoke-shaped shifting member 93 is provided which is pivotally mounted in the enlarged forward ends 23 of the arms 22. The member 93 extends through the openings 24. The forward ends of the arms of the member 93 are provided with eyes 94 through which extend lugs 95 projecting inwardly from the rear ends of the side portions 88 and 89 of the element 87. A tread lever arm 96 projects forwardly with respect to the rear bar or member 13 of the section 8 and which is fixedly secured as at 97 to the member 93. By forcing the tread lever 96 downwardly the forward portion of the element 87 is raised. Secured to one side of section 8 and arranged forwardly of the axle 1 is an inwardly extending stop member 29. The upward movement of the forward portion of the element 87 is arrested by the stop member 29 which is arranged in the path of the side portion 88 of the supporting element 87.

Secured to the forward portion 90 of the supporting element 87 by a securing bracket 98 is a bearing 99 which is disposed lengthwise with respect to the machine. The bearing 99 projects forwardly and rearwardly with respect to the forward portion 90 of the supporting element 87. Journaled in the bearing 99 is a shaft 100 having its rear end provided with a beveled pinion 101 and its forward end with a disc 102. The pinion 101 is operated by a beveled gear 103 which is loosely mounted on the axle 1 and is adapted to be coupled to the latter in a manner to be presently referred to. The disc 102 is provided with an eccentrically disposed pin 104 upon which is loosely mounted an arm 105 which extends transversely of the machine at a right angle from the shank 106 of the chopper or hoe member 107, the latter being secured to the lower end of the shank 106 by the holdfast devices 108 and is disposed at an upward inclination. The hoe member is further disposed at an angle to the longitudinal and transverse medians of the machine. The shank 106 is also disposed at an inclination with respect to the section 8 of the supporting frame and during its reciprocation travels through a swiveled guide 109 carried by an upstanding lug 110 secured to the front portion 90 of the supporting element 87. The shank 106 intermediate its ends is provided with an eye 111 to which is connected a retaining bar 112 which projects rearwardly from the portion 10 of the section 7. The retaining bar 112 at its rear end is formed with a loop 113 which engages the eye 111 and at its forward end is provided with the loop 113 which is connected to an eye bolt 114 carried by the portion 10 of the section 7.

Upon the rotation of the disc 102, the pin 104 causes the shank 106 and arm 105 to move in an arc, and, due to the engagement of the shank 106 with the guide 109, the arm 105 is pivoted about the pin 104, a sliding motion is imparted to the shank 106 through the guide 109, and a swiveling motion is imparted to the latter. During the operative movement of the disc 102, the angles of inclination of the shank 106, arm 105 and hoe member 107 are constantly changing, and during a complete revolution of the disc 102, the hoe member 107 is revolved in a vertically disposed path of movement transversely of the machine, and in such movement describes an ellipse having its major axis disposed horizontally and its minor axis disposed vertically. Thus the upper and lower arcs of the elliptical movement of the hoe member are greater than the end arcs thereof and such movement substantially is a simulation of the movement of a hand operated hoe. The cutting quality of the hoe member cutting edge is enhanced due to the angular disposition of the hoe member relative to the longitudinal and transverse medians of the machine. During the chopping operation of the hoe member 107, a rearward strain is exerted on the lower end of the shank 106 due to the forward thrust of the hoe member in contact with the ground as the machine advances in a forward direction. This strain is taken up by the retarding bar or radius rod 112 which is of just sufficient length to permit the hoe member to travel in its elliptical path and is positioned with respect to such path in a manner to prevent play at its points of connection with the eyes 111 and 114 while the hoe member is traversing the lower arc of its path of movement.

The axle 1 has connected thereto a collar 115 against which the hub of the gear wheel 113 abuts. The hub of the gear wheel, indicated at 116 is extended and provided with a clutching face 117 which associates with a clutching member 118 keyed to the axle 1. Secured to the section 8 at one side thereof and rearwardly with respect to axle 1, is an upstanding bearing 27. Positioned rearwardly with respect to bearing 27, as well as aligning with the latter and supported from member 13 is an upstanding bearing 28. A shifting lever 119 is provided for moving the clutching member 118 in engagement with the clutching face 117 of the hub 116, so as to connect the gear wheel 103 to the axle 1 whereby said gear wheel 103 will revolve with the axle 1 thereby providing for the operation or reciprocation of the chopper or hoe member 107. The lever 119 is journaled in the bearings 27, 28, see Figure 3, and is extended so as to be in convenient reach of the driver of the machine, also see Figure 3.

When the sections 7 and 8 of the supporting frame are elevated, the cultivators are removed from the soil. Any suitable means can be employed for retaining the lever 82 in set position and this also applies to the tread 96.

The machine, as aforesaid, provides a new and novel means for expeditiously and efficiently chopping or thinning and cultivating cotton, and therefore it is thought that the many advantages of a machine in accordance with this invention can be readily understood, and although the preferred embodiment of the invention is as illustrated and described, yet it is to be understood that changes in the details of construction can be had which fall within the scope of the invention as claimed.

What I claim is:—

1. In a cotton chopping machine, a hoe member disposed at an angle to the longitudinal and transverse medians of the machine, a shank to which said hoe member is secured at an angle, and means operatively connected with said shank for imparting a vertically disposed, revolving movement to said hoe member transversely of the machine, said means including a rotatable disc mounted transversely on the machine and having a horizontal axis, an upwardly inclined arm formed on said shank at a right angle thereto, said arm extending transversely of the machine, and means for pivotally connecting the outer end of said arm to said disc eccentrically of the latter.

2. In a cotton chopping machine, a hoe member disposed at an angle to the longitudinal and transverse medians of the machine, a shank to which said hoe member is secured at an angle, means operatively connecting the shank with the machine whereby a forward motion of the latter imparts a vertically disposed revolving movement to said hoe member transversely of the machine, said hoe member contacting with the ground during a portion of such movement, and a forwardly extending radius rod pivotally connected at its respective ends to the machine and said shank and positioned with respect to the path of said movement to prevent play at its point of pivotal connection during the periods of contact of the hoe member with the ground.

In testimony thereof, I affix my signature hereto.

CLAUDIUS V. JONES.